(12) United States Patent
Crebier et al.

(10) Patent No.: US 9,478,980 B2
(45) Date of Patent: Oct. 25, 2016

(54) SYSTEM FOR BALANCING, BY MAGNETIC COUPLING, AN ASSOCIATION IN SERIES OF ELEMENTS FOR GENERATING OR STORING ELECTRICAL ENERGY

(75) Inventors: Jean-Christophe Crebier, Grenoble (FR); Alexandre Chureau, Grenoble (FR)

(73) Assignees: Institut Polytechnique de Grenoble, Grenoble (FR); Centre National de la Recherche Scientifique, Paris (FR)

( * ) Notice: Subject to any disclaimer, the term of this patent is extended or adjusted under 35 U.S.C. 154(b) by 740 days.

(21) Appl. No.: 13/579,786

(22) PCT Filed: Feb. 14, 2011

(86) PCT No.: PCT/FR2011/000087
§ 371 (c)(1),
(2), (4) Date: Mar. 25, 2014

(87) PCT Pub. No.: WO2011/101555
PCT Pub. Date: Aug. 25, 2011

(65) Prior Publication Data
US 2014/0197795 A1    Jul. 17, 2014

(30) Foreign Application Priority Data
Feb. 17, 2010 (FR) ..................... 10 00671

(51) Int. Cl.
*H02J 7/00* (2006.01)
*H02J 1/00* (2006.01)
*H02J 7/35* (2006.01)

(52) U.S. Cl.
CPC ............... *H02J 1/00* (2013.01); *H02J 7/0014* (2013.01); *H02J 7/0018* (2013.01); *H02J 7/35* (2013.01); *Y02E 10/566* (2013.01); *Y10T 307/685* (2015.04)

(58) Field of Classification Search
CPC ............... H02J 7/04; H02J 5/005; H02J 3/28
USPC .......................................................... 320/118
See application file for complete search history.

(56) References Cited

U.S. PATENT DOCUMENTS

| 5,642,275 A | * | 6/1997 | Peng et al. ..................... 363/137 |
| 6,873,134 B2 | | 3/2005 | Canter et al. |
| 2011/0063883 A1 | * | 3/2011 | Hattori et al. ................ 363/148 |
| 2011/0121661 A1 | * | 5/2011 | Kawakami et al. .......... 307/110 |
| 2011/0128763 A1 | * | 6/2011 | Iwata et al. ..................... 363/98 |

OTHER PUBLICATIONS

Ridley, The Nine Most Useful Power Topologies, Power Systems Design Europe, pp. 15-18, 2007.
Shimizu, Generation Control Circuit for Photovoltaic Modules, IEEE Transactions on Power Electronics, 16, pp. 293-300, 2001.

* cited by examiner

*Primary Examiner* — Suchin Parihar
(74) *Attorney, Agent, or Firm* — Morgan, Lewis & Bockius LLP

(57) ABSTRACT

System for balancing an association in series of elements for generating and/or storing electrical energy has full bridge inverters ($OPC_1$, $OPC_2$, $OPC_N$), with two inverter arms connected in parallel between two end ports and with two switches ($T_{h1}$, $T_{b1}$; $T_{h2}$, $T_{b2}$) connected in series by a median point ($P_{11}$, $P_{12}$) of the arm; a plurality of connectors for connecting the two end ports of each full bridge inverter to a respective element ($CA_1$, $CA_2$, $CA_N$, $PV_1$, $PV_2$, $PV_N$) of said association in series; and a magnetic coupler (NM) formed by a magnetic core on which a plurality of windings ($W_1$, $W_2$, $W_N$) is formed, each winding connected to the median points of the arms of one of said inverters. A series of elements ($CA_1$, $CA_2$, $CA_N$) for electrochemical storage of electrical energy and a series of photovoltaic cells ($PV_1$, $PV_2$, $PV_N$) provided with such a balancing system are also disclosed.

16 Claims, 12 Drawing Sheets

SYSTEM FOR BALANCING, BY MAGNETIC COUPLING, AN ASSOCIATION IN SERIES OF ELEMENTS FOR GENERATING OR STORING ELECTRICAL ENERGY

RELATED APPLICATIONS

The present application is a U.S. National Phase Application of International Application No. PCT/FR2011/000087 (filed Feb. 14, 2011) which claims priority to French Application No. 1000671 (filed Feb. 17, 2010) which are hereby incorporated by reference in their entirety

FIELD OF THE INVENTION

The invention relates to a system for balancing a series association of elements for generating and/or storing electrical energy, such as photovoltaic cells or electrochemical storage cells or storage cell units. The invention also applies to a series association of elements for generating and/or storing electrical energy that is provided with such a balancing system. More precisely, the balancing system of the invention is of the type that makes use of magnetic coupling between the various elements.

BACKGROUND

As shown in FIG. 1, electrochemical batteries are generally modular in structure. A base element is constituted by an individual storage cell A, made up of a single electrochemical cell. A plurality of storage cells connected in parallel forms a storage cell unit CA; such a unit delivers a voltage equal to the voltage of a single storage cell, but delivers greater current and storage capacity. In order to raise the voltage level delivered by the battery, a plurality of storage cell units are connected in series, forming a so-called "module" M. A plurality of modules may in turn be connected in series to form a so-called "stack" S. A complete battery BATT is made up of a plurality of stacks connected in parallel.

The system of the invention seeks in particular to enable voltage to be balanced between the various elements (cell units, modules) of a battery, that are connected mutually in series.

The problem of voltage balancing is illustrated by FIG. 2A which shows a battery made up of an association of four storage cell units CA1, CA2, CA3, and CA4, which battery is connected to a current generator in order to be charged. Ideally, all four units should be charged to the same voltage of 4 volts (V) in order to provide an overall voltage of 16 V at the terminals of the battery. In reality, there exist dispersion phenomena associated with conditions of fabrication, utilization, and aging of the elements, which cause some of them to charge or discharge more quickly than others, or to do so at different voltage levels. Thus, in FIG. 2A, the elements CA1 and CA4 are charged to a voltage of less than the nominal value 4 V, while the element CA2 is charged to a value that is significantly greater (4.3 V) and that might damage it. Conversely, the element CA4 is charged to a voltage of only 3.8 V; this element thus runs the risk after prolonged use of being in a deep discharge state, which is just as damaging, and which might not be detected by measuring only the voltage across the terminals of the series association. These problems are particularly acute with lithium batteries which are very sensitive to undercharging and to overcharging.

A similar problem occurs when associating photovoltaic cells in series, as is needed to raise the voltage level delivered by a single cell. If one of the cells in the association is faulty, or is merely exposed to light flux that is less intense than the others (because its surface is dirty, or because it is in the shade), a negative potential difference may appear across its terminals, thereby greatly reducing the overall power level generated by the association.

FIG. 2B shows such a series association of photovoltaic cells $PV_1, \ldots, PV_N$ represented by reverse-biased diodes. A maximum power point tracker (MPPT) connected in series with the cells determines the magnitude of the current flowing through the series association so as to maximize the power generated by the photovoltaic effect. In FIG. 2C, curve CIV1 shows the current (I)/voltage (V) characteristic of the photovoltaic cells when exposed to the same light flux; the curve CIV2 the characteristic of a cell that, starting from an instant T, is exposed to a lesser light flux, e.g. because of dirt.

For t<T, when all of the cells are illuminated in the same manner and therefore follow the same characteristic CIV1, the MPPT module imposes a current $I_{OPTI}$ through the series association, and that leads to a potential difference $V_{OPTI}$ across the terminals of each cell, such that:

$$P_{OPTI} = n \cdot V_{OPTI} \cdot I_{OPTI} = n \cdot \max(V \cdot I)$$

Starting from the instant t=T, one of the cells, $PV_i$, receives less light flux, and its characteristic becomes that of the curve CIV2.

If the current flowing through the series association remains equal to $I_{OPTI}$, the potential difference at the terminals of the shaded or dirty cell $PV_i$ becomes negative and equal to $-V_B$, (avalanche breakdown voltage). The loss of power is thus equal to:

$$\Delta P_1 = -I_{OPTI}(V_{OPTI} + V_B)$$

The MPPT module may react to this situation by reducing the current to the level $I' = I_{OPTI} - \Delta I$, such that the cell $PV_i$ produces energy once more. Nevertheless, the total power is reduced to $$P' = I' \cdot [(n-1) \cdot V_2 + V']$$

with a loss of power $$\Delta P_2 = P' - P_{OPTI}$$

$V_2$ being the voltage across the terminals of the cells $PV_j$ (j≠1) for I=I' and V' being the voltage across the terminals of the cell $PV_i$ for I=I'.

In any event, it is important to observe that merely reducing the illumination of a single photovoltaic cell leads to a significant reduction in the power generated by the series association.

In order to mitigate the drawbacks of series associations of elements for generating and/or storing electrical energy— where electrochemical storage cells and photovoltaic cells are merely non-limiting examples of such elements—it is necessary to provide balancing systems.

The state of the art includes several voltage balancing systems for elements for electrochemically storing electrical energy.

The most common balancing systems are of the passive or dissipative type. For example, while charging, those systems act continuously or periodically to measure the potential difference across the terminals of each of the series-connected elements, and they divert to a dissipater resistor the current that can no longer be absorbed by the elements of smaller capacity. It can be understood that such systems lead to losses of energy that are difficult to accept; in the event of wide dispersion in the characteristics of the various electrochemical elements, the size of the heat dissipaters can become prohibitive. Discharging of the battery must be stopped when the lowest capacity elements have reached their low acceptable voltage limit; this means that the storage capacity of the battery is limited by the storage capacity of its worst elements.

There also exist active balancing systems that redistribute current within the battery instead of dissipating it. Thus, while charging, such systems divert the current that can no longer be absorbed by the "weaker" elements to the "stronger" elements, having storage capacity that is not yet used up. While discharging, they take additional current from the "stronger" elements in order to compensate for the lack of current coming from the "weaker" elements. The main drawbacks of such systems are their complexity and their high cost.

The article by N. Kutkut and D. Divan "Dynamic equalization techniques for series battery stacks", $18^{th}$ International Telecommunication Energy Conference, 1996 (INTELEC'96), pp. 514-521, describes several active balancing systems.

The simplest of those systems establishes a bypass path for each element, each of said paths including a switch that is normally open. When an element reaches its maximum charge level, the switch closes, thereby diverting the charging current to an energy storage inductance. After a certain length of time, the switch opens again, and the energy stored in the inductance is delivered to the battery element located immediately downstream in the series association. The cycle then restarts. The drawback of that system is that it allows energy to be transferred in one direction only, from "upstream" elements (close to the cathode of the battery, thus situated at a higher electric potential) towards "downstream" elements (close to the anode, and thus situated at a lower electric potential). In order to achieve transfer in both directions, it is necessary to provide a structure that is more complex, forming a direct current/direct current (DC/DC) voltage converter of the half-bridge type with an inductive load connected between each pair of adjacent battery elements in the series association.

Document U.S. Pat. No. 6,150,795 describes an active both-way balancing system in which energy can be transferred between adjacent battery elements via respective magnetic couplers. As in the above-described situations, energy transfer takes place only from neighbor to neighbor.

Other systems of a centralized type perform overall balancing of battery elements by means of a multi-winding magnetic coupler to which all of the elements are connected via respective switching circuits. An example of such a system is described by document U.S. Pat. No. 6,873,134—see in particular its FIG. 11, which is considered as constituting the closest prior art. Such a system is shown in simplified manner in FIG. 3. References $CA_1$, $CA_2$, ..., $CA_i$, ... represent different storage cell units connected in series. The reference NM labels a magnetic core that is common to all of the storage cell units and that acts as a coupler. A plurality of windings $W_1$, $W_2$, ..., $W_i$, ... associated with the respective storage cell units are made on the core NM. More precisely, these windings are double windings, each having two end contacts $P_1$ and $P_3$ with a midpoint $P_2$. The midpoint $P_2$ of each winding is connected to the positive terminal (cathode) of the corresponding storage cell unit; the two end contacts $P_1$ and $P_3$ are connected to its negative terminal (anode) via respective transistors $T_1$, $T_2$ that form a half-bridge inverter. The transistors $T_1$ of the various units are controlled synchronously; the same applies in complementary manner to the transistors $T_2$. It can be understood that the magnetic flux induced in the magnetic core NM changes sign depending on whether it is the transistors $T_1$ that are conductive while the transistors $T_2$ are non-conductive, or vice versa. By activating the switching $T_1$ and $T_2$ in alternation, so-called "natural" balancing of the charging voltage of the battery elements is obtained: elements with greater charge deliver energy to elements with smaller charge via the magnetic core NM.

The main drawback of the balancing system of FIG. 3 lies in its bulk, in particular because a double winding with a midpoint is used for each battery element (storage cell, storage cell unit, or module), to be balanced. Another drawback is that the system is not capable of handling the failure of a storage cell unit.

The problem of balancing or compensation in series associations of photovoltaic cells is known in particular from the article by T. Shimizu et al. "Generation control circuit for photovoltaic modules", IEEE Transactions on Power Electronics, Vol. 16, No. 3, May 2001. That article proposes a first circuit based on using a magnetic coupler and performing balancing of centralized type. That circuit is of relatively large size. The article also discloses a second balancing circuit based on a multi-stage chopper circuit for which control is relatively complex.

The article by T. Mishima and T. Ohnishi "Power compensation system for partially shaded PV array using electric double layer capacitors", $28^{th}$ Annual Conference of the IEEE Industrial Electronics Society (IECON 02), 5-8 Nov. 2002, Vol. 4, pp. 3262-3267, discloses an alternative balancing circuit for series associations of photovoltaic cells making use of capacitive storage of electrical energy. That circuit is both complex to control and also bulky, since it relies on using several banks of relatively high capacitance capacitors.

SUMMARY

The invention seeks to remedy—in full or in part—the above-mentioned drawbacks of the prior art.

In accordance with the invention, this object is achieved by a system for balancing a series association of elements for generating and/or storing electrical energy, the system being characterized in that it comprises: a plurality of full-bridge inverters each of which is constituted by two inverter arms connected in parallel between two end ports of the inverter, each inverter arm being constituted in turn by two switches connected in series via a so-called "midpoint" of the arm; a plurality of connectors for connecting the two end ports of each full-bridge inverter to a respective element of said series association; and a magnetic coupler formed by a magnetic core having a plurality of windings wound thereon, each of said windings being connected to the midpoints of the arms of a respective one of said inverters.

Compared with the system of FIG. 3, the system of the invention presents the advantage of having only one single winding—instead of a double winding—for each element that it is to be balanced (e.g. an electrochemical cell). It is indeed true that this simplification of the passive portion of the system is accompanied by an increase in the complexity of its active portion: the prior art half-bridge inverter is replaced by a full-bridge inverter, having four switches (transistors) instead of two. In addition, it is more difficult to control the full-bridge inverter of the invention: it is necessary to ensure that the two switches in any given arm are never closed simultaneously, since that would short-circuit the corresponding battery element. Nevertheless, the active elements can be integrated in effective manner. Consequently, the balancing system of the invention is found to be significantly simpler, less expensive, and smaller in size than that of above-mentioned document U.S. Pat. No. 6,873,134.

According to particular embodiments of the invention:

A protection switch may be connected in series with an end port of each inverter.

In a variant, when each of said elements of the electrochemical battery is constituted by a parallel association of sub-elements, each protection switch may be connected in series between each of said sub-elements and an end port of the corresponding inverter.

A respective filter capacitor may be connected in parallel with each element of said series association, between the two end ports of the corresponding inverter.

The system may also include control means for controlling said inverters in such a manner so as to balance said elements.

The system may also include measurement means for measuring the voltage across the terminals of each element of said series association, said control means being adapted to operate said inverters when the maximum voltage difference between two elements exceeds a first threshold, and until said difference drops below a second threshold.

Said measurement means may comprise a current sensor connected in parallel with a switch of an inverter, the control means being adapted to control each inverter in individual manner in order to store energy in magnetic form in the core of the magnetic coupler, and then to control the inverter fitted with said current sensor so as to discharge said energy in the form of an electric current directed through said sensor.

Said control means may be adapted to control a plurality of said inverters in synchronous manner, with a common duty ratio substantially equal to 0.5, in order to perform "natural balancing" as in the system shown in FIG. 3. Under such circumstances, said control means may be arranged to control a single one of said inverters, referred to as a "master" inverter; while the switches of the other inverters of the system, referred to as "slave" inverters, may be controlled by the voltages that appear at the terminals of the respective windings as a result of the operation of said master inverter.

In a variant, said control means may be adapted:
  to act over one half-cycle to control one or more inverters connected to one or more elements of said series association presenting a voltage greater than a reference value in such a manner as to store energy in magnetic form in the core of the magnetic coupler; and then
  over a half-cycle, to control the inverter(s) connected to one or more elements of said series association presenting a lower voltage in such a manner as to discharge said magnetic energy; and
  to repeat the above operations cyclically, in order to perform "forced balancing" in which energy is extracted from one or more elements of said series association in order to be injected specifically into one or more other elements via the magnetic coupler.

Said control means may be adapted to control said inverters in synchronous manner with an adjustable phase shift between the signals controlling the various inverters.

As explained above, each inverter may be monolithically integrated on a respective chip. Each of said chips may also integrate close control means for said switches, which are implemented in the form of power transistors. Advantageously, said chips may be made using CMOS technology.

The invention also provides a series association of photovoltaic cells or of elements for electrochemically storing electrical energy, which association is provided with a balancing system as described above.

BRIEF DESCRIPTION OF THE DRAWINGS

Other characteristics, details, and advantages of the invention appear on reading the description made with reference to the accompanying drawings by way of example, and in which.

DETAILED DESCRIPTION

Figure 4:
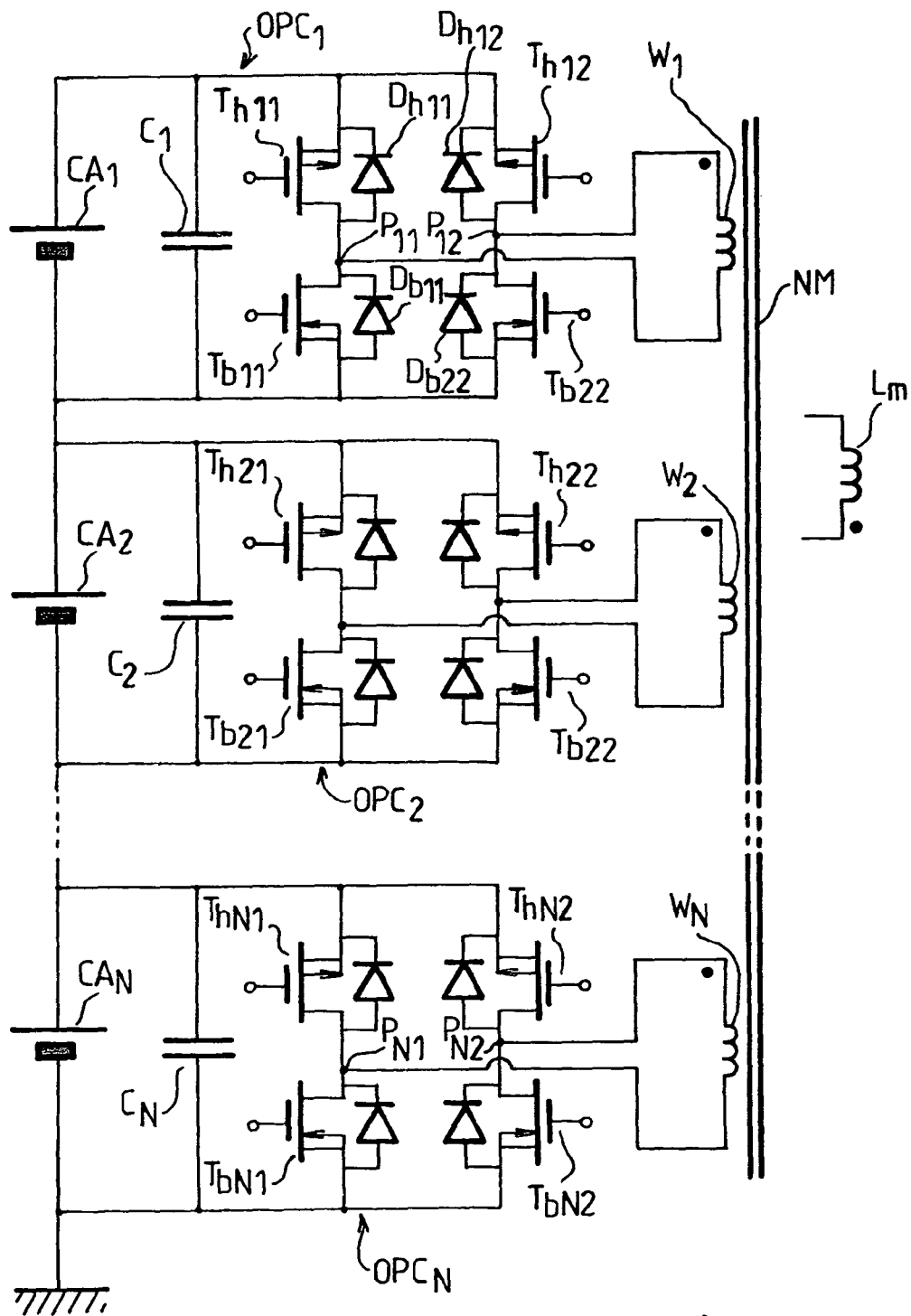
FIG. 4 is a general diagram of an active balancing system of the invention.

As shown in FIG. 4, a balancing system of the invention associates each battery element $CA_1$, $CA_2$, ..., $CA_N$ with a module formed by a full-bridge inverter and a magnetic coupler winding.

Each full-bridge inverter $OPC_1$, $OPC_2$, ..., $OPC_N$ is constituted by a parallel association of two bridge arms, having the end ports thereof connected to the terminals of the corresponding battery element by respective connectors; each bridge arm, in turn, is constituted by two switches in series. In the embodiment described herein, the bridge arms are made using complementary metal oxide on silicon (CMOS) technology: the "top" switch (for connecting to the positive terminal of the battery element) in each arm is made using positive metal oxide on silicon (PMOS), while the corresponding "bottom" switch (for connecting to the negative terminal of the battery element) is made of negative metal oxide on silicon (NMOS) technology. In the Figure "$T_{hnm}$" and "$T_{bnm}$" designate respectively the top ("high") transistor and the bottom transistor of arm number n (n=1 or 2) in the inverter associated with battery element number m (m=1 to N). The diodes of the transistor bodies are referenced "$D_{hnm}$."

The midpoints $P_{1i}$, $P_{2i}$ of the arms (where "i" is the index of the inverter) are connected to respective windings $W_i$ wound on a common magnetic core NM that provides magnetic coupling between all of the windings. The magnetic core NM and the windings $W_i$ form a magnetic coupler connecting all of the modules together.

The reference $L_m$ indicates the magnetizing inductance of the coupler.

Respective capacitors $C_1, \ldots, C_N$ are connected in parallel with each battery element. Their main function is to filter the high frequency components generated by the chopping of electrical magnitudes (voltages, currents) when the transistors switch. As described in greater detail below, they also serve to ensure power supply continuity to the inverter and the associated electronics.

Figure 5A:
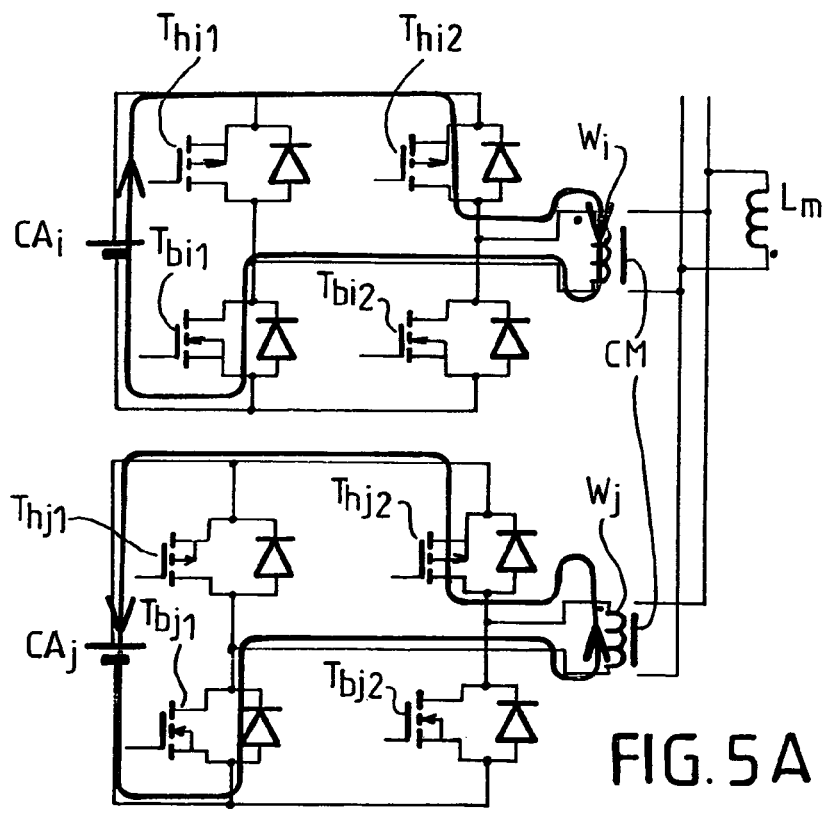
FIGS. 5A, 5B, and 6A, 6B illustrate the operation of the FIG. 4 system in a "natural" balancing mode.
Figure 5B:
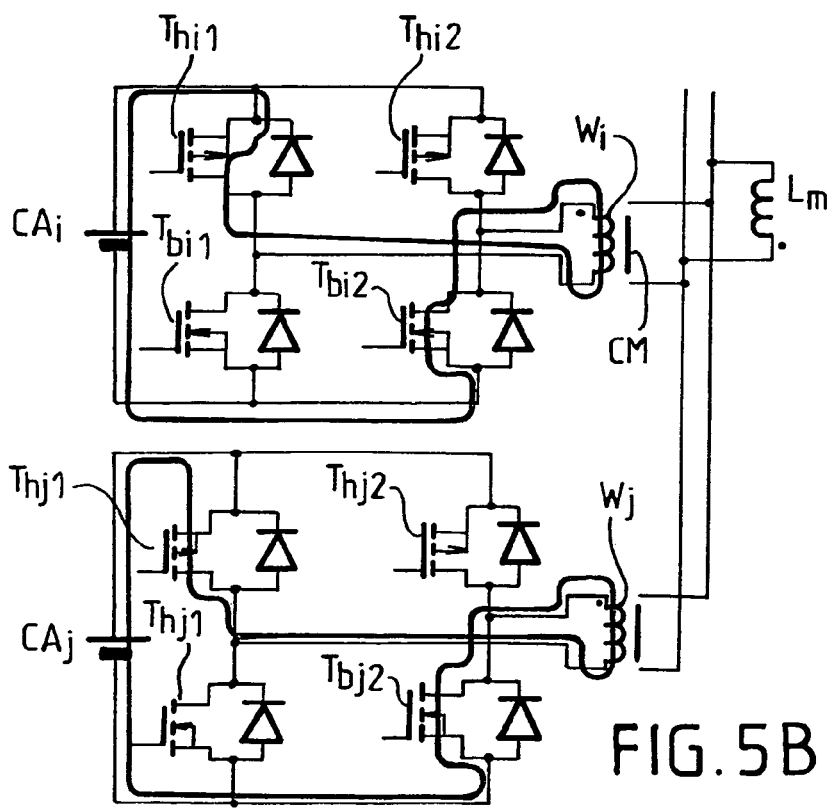

FIGS. 5A and 5B show the operation of the FIG. 4 system under "natural" balancing conditions. Under such conditions, all of the inverters are controlled synchronously by a pulse width modulation control signal having a duty ratio equal to 0.5, and preferably having a frequency greater than 20 kilohertz (kHz), i.e. above the hearing threshold so as to avoid generating sound nuisance.

During a first half of the cycle (FIG. 5A) the bottom switch in the first arm and the top switch in the second arm of each inverter are closed; in the second half of the cycle (FIG. 5B), it is the top switch in the first arm and the bottom switch in the second arm that are closed. FIGS. 5A and 5B show only two battery elements and the corresponding inverters: the element $CA_i$ is the more charged; while the element $CA_j$ is charged to a lower voltage level.

The more charged element $CA_i$ tends to discharge through the winding $W_i$; the current flowing through the winding generates a varying magnetic flux in the magnetic core NM, which in turn generates current in the winding $W_j$. As shown in FIG. 5A, this current flows in a direction opposite to the current flowing through $W_i$, and tends to charge $CA_j$. Energy transfer is then limited by the impedances between the two elements $CA_i$ and $CA_j$: the series resistances of the windings, the resistances of the transistors while they are in the conductive state. The transistors are dimensioned on the basis of the maximum level of balancing current that it is desired to allow. In a variant, it is possible to connect a discrete resistor in series, with the advantage of making it possible to use "standard" chips for a variety of applications, with only the discrete resistors being changed from one application to another.

The problem is that a portion of current that flows through the winding $W_i$ charges the magnetizing inductance $L_m$ of the magnetic coupler formed by the magnetic core and the various windings (this current is not shown in FIGS. 5A and 5B in order to avoid overcrowding them). In order to ensure that this inductance does not become saturated, it is necessary after a certain length of time (a few tens of microseconds) to reverse the polarization of the windings so as to ensure that the mean voltage at their terminals is zero: the switches that were closed during the first half of the cycle are opened and those that were open are closed. The currents reverse direction, as shown in FIG. 5B, however the element $CA_j$ continues to charge at the expense of $CA_i$. In addition, the energy stored in the magnetizing inductance $L_m$ of the coupler is released, being stored once more in the form of a current in the opposite direction.

The above comments relating to $CA_j$ apply equally to all of the elements charged to a voltage lower than that of $CA_i$.

Figure 6A:
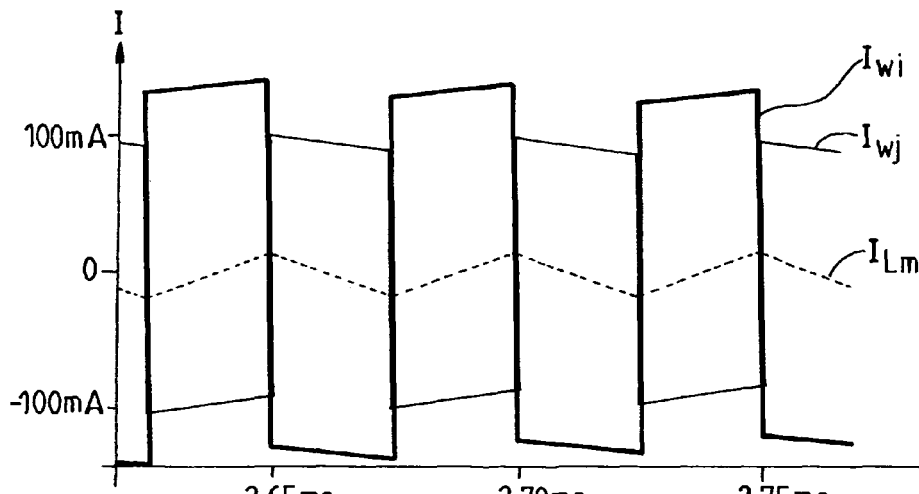

In FIG. 6A, the lines $I_{Wi}$, $I_{Wj}$, and $I_{Lm}$ show the variation in time (on a scale of milliseconds (ms)) of the currents flowing though the two windings $W_i$ and $W_j$ and the magnetizing inductance $L_m$, respectively. It can be seen in this figure that current oscillations are progressively damped, representing a balance being established between the two storage elements $CA_i$ and $CA_j$.

Figure 6B:
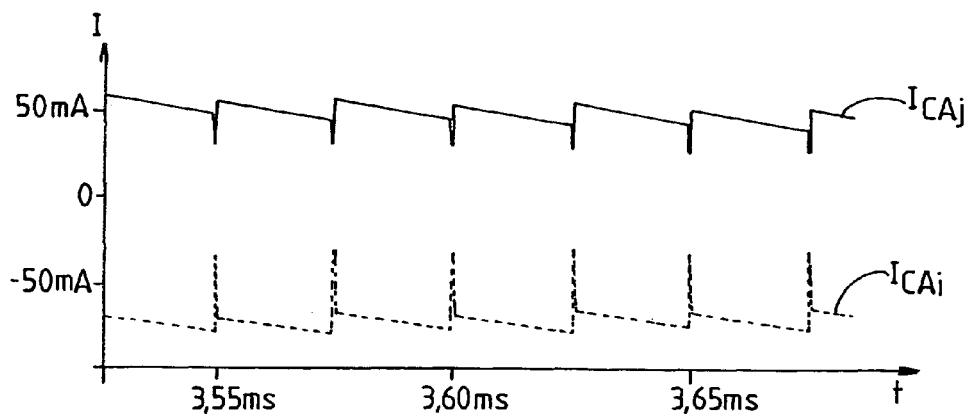

In FIG. 6B, the lines $I_{CAi}$ and $I_{CAj}$ show the variation over time (on a scale in ms) of the currents flowing through the two battery elements $CA_i$ and $CA_j$ (negative sign for a discharging current, positive sign for a charging current). These currents converge slowly towards zero, which is likewise representative of charge balance being established.

Figure 7:
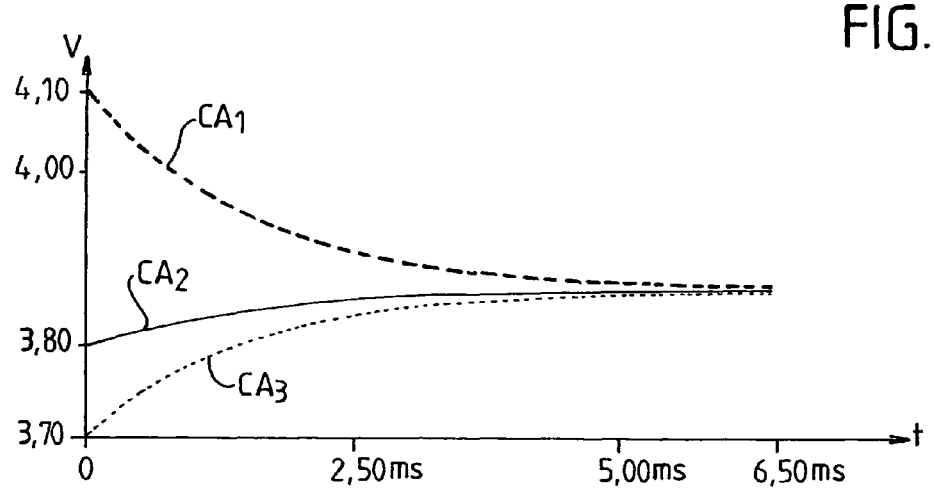
FIG. 7 shows the progressive balancing of the charging potentials of three electrochemical cells by means of the FIG. 4 system.

FIG. 7 shows the natural balancing of three storage cell units: CA1, initially charged to 4.1 V; CA2, initially charged to 3.8 V; and CA3, initially charged to 3.7 V. It can be seen that the voltages of the three units converge on a common value of about 3.85 V in less than 7 ms.

"Natural" balancing does not necessarily apply to all of the battery elements: it is possible to control only a subset of the inverters, leaving the others in an open configuration so that they decouple the corresponding battery elements from the balancing system. Under such circumstances, balancing takes places only between the battery elements that are associated with active inverters.

There also exists another mode of operation that may be referred to as "forced", in which energy is transferred indirectly with temporary storage via the magnetizing inductance $L_m$. In this mode of operation, operation takes place in two stages. In the first half-cycle, only one inverter (or a plurality of inverters associated with elements charged to similar voltage levels, having differences of no more than a few millivolts) is/are operated, while the others are inactive and isolate the respective battery elements from the magnetic coupler. The inverter that is being operated is associated with a battery element that needs to be partially discharged in order to transfer its excess charge to other elements. Two switches of the inverter are closed so as to allow an electric current to flow through the winding (e.g.: top switch of second arm and bottom switch of first arm). Since the other windings of the magnetic coupler are open-circuit, this current serves in full to charge the magnetizing inductance $L_m$.

In the second half-cycle, the switches of the inverter that was previously being operated are open, while the inverters associated with battery elements that are to receive additional charge are operated so as to enable the energy stored in the magnetizing inductance during the first half-cycle to be discharged.

Figure 8A:
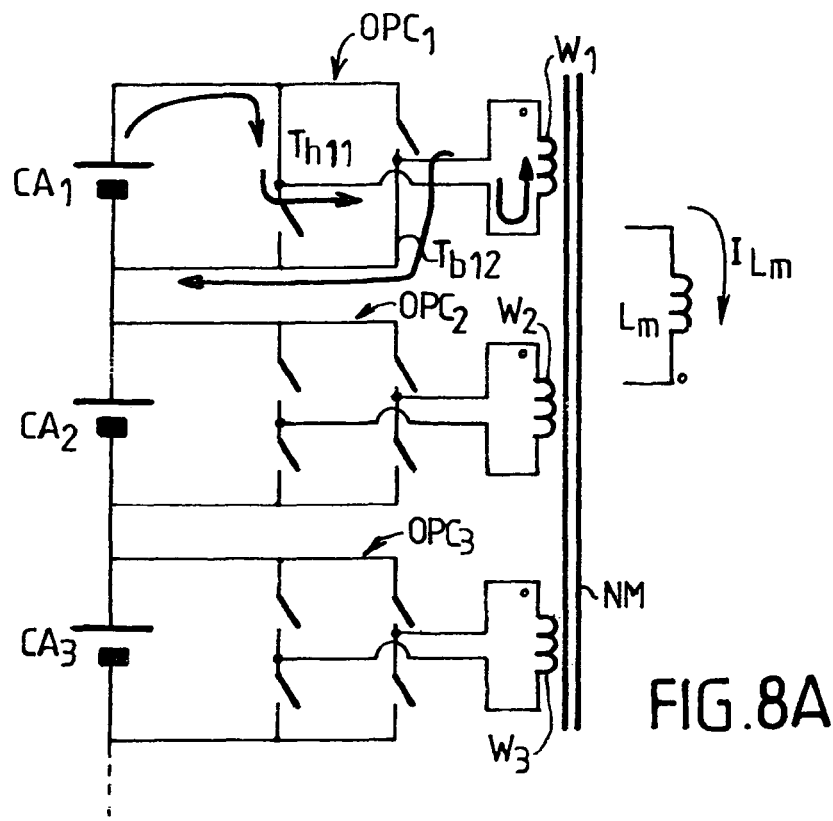
FIGS. 8A and 8B show the operation of the FIG. 4 system in a "forced" balancing mode.
Figure 8B:
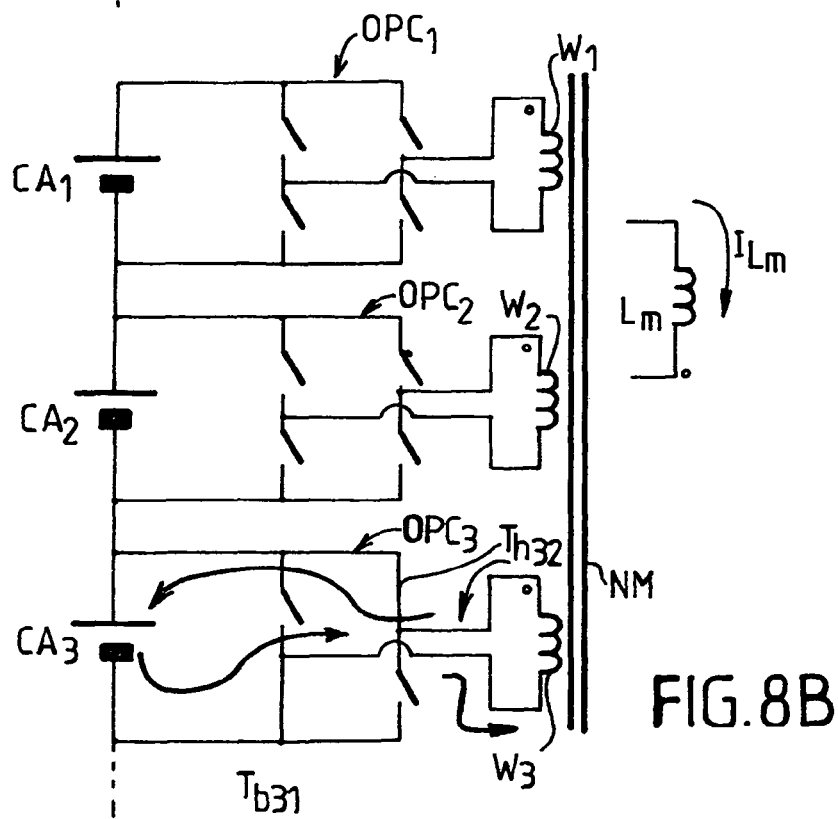

FIGS. 8A and 8B are highly diagrammatic and show a forced transfer of energy from the element $CA_1$ to the element $CA_3$, passing via temporary energy storage in the magnetizing inductance $L_m$.

As explained above, in the first half-cycle (FIG. 8A), only the switches $T_{h11}$ and $T_{b12}$ of the first inverter $OPC_1$ are closed; the element $CA_1$ then discharges in part through the winding $W_1$. This induces a current $I_{Lm}$ in the magnetizing inductance $L_m$, which current increases linearly with time. During this first half-cycle, all of the other switches of the other inverters are open. Thus, no current can flow in the windings $W_2$, $W_3$, . . . in spite of the potential difference (equal to $V_{CA1}$) that appears across their terminals by magnetic coupling.

Thereafter, in the second half-cycle (FIG. 8B), the switches $T_{h11}$ and $T_{b12}$ of $OPC_1$ are open, while the switches $T_{h32}$ and $T_{b32}$ of the inverter $OPC_3$ are closed. The current flowing through the magnetizing inductance $L_m$ begins to decrease linearly, thereby reversing the potential difference at the terminals of the windings $W_1, W_2, W_3, \ldots$. Given that the switches $T_{h32}$ and $T_{b32}$ are closed, current can flow in the winding $W_3$; it can be seen that this current tends to charge the element $CA_3$. Thus, a portion of the energy stored in $CA_1$ is transferred to $L_m$ during the first half-cycle, and then to $CA_3$ during the second half-cycle.

Thereafter, the cycle restarts.

Forced balancing is more complex to implement than natural balancing. In addition, if control is not performed properly, it can lead to "overbalancing", i.e. to the element(s) that was/were initially undercharged becoming overcharged.

Its strong point is represented by its flexibility: it enables energy to be transferred from a given battery element to one or more others in controlled manner. In addition, in certain special circumstances "overbalancing" can be intentional, e.g. if it is desired to "anticipate" weakness on the part of an element during discharging (by overcharging—without exceeding safety limits—to compensate for the fact that it discharges more quickly than the other elements).

In contrast, forced balancing cannot operate if the potential difference between the most-charged elements and the least-charged elements is too great, typically greater than about 1.4 V. It must not be forgotten that the inverters are not constituted by ideal switches, but rather by power transistors that include respective anti-parallel body diodes. If $V_{CA1}$-$V_{CA3}$ is greater than about 1.4 V (twice the activation voltage of those diodes), they become conductive in unwanted manner, and that is incompatible with the above-described operating scheme.

Forced balancing is described above with reference to an example involving only one energy donor element ($CA_1$) and one energy receiver element ($CA_2$). Nevertheless, it is also possible to use a plurality of donor elements—providing they are all charged to the same voltage level—and a plurality of receiver elements—even if they are charged to different voltage levels. The voltage balancing of elements connected in series in a battery requires measurements to be made (continuously or periodically) of the voltages across the terminals of the various elements. This is clearly essential for forced balancing, and is also practically unavoidable with natural balancing. Natural balancing inevitably gives rise to energy losses: consequently, it is preferable for the inverters to be operated only when necessary. Specifically, natural balancing is activated when the potential difference between the most-charged element and the least-charged element exceeds a first threshold; once this difference has dropped below a second threshold (less than the first: hysteresis), then balancing is stopped.

In the prior art, those measurements are performed by using a respective voltage sensor for each balancing element. That solution increases the complexity and the cost of the system. There is also the problem of dispersion in measurement errors resulting from using different sensors.

Figure 9A:
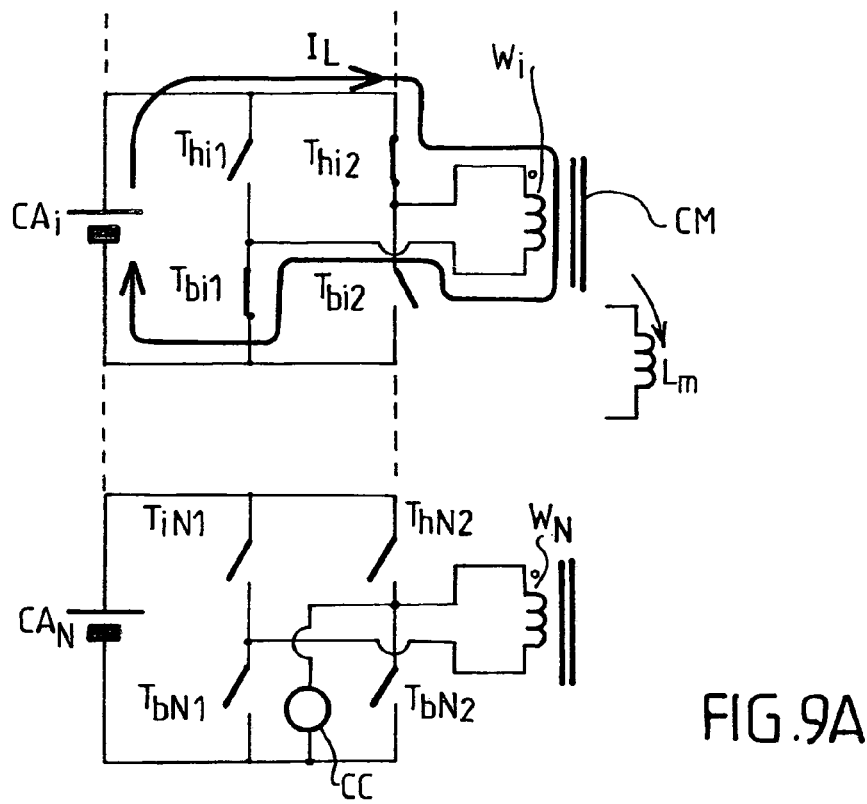
FIGS. 9A and 9B show how a voltage measurement may be made at the terminals of each battery element.
Figure 9B:
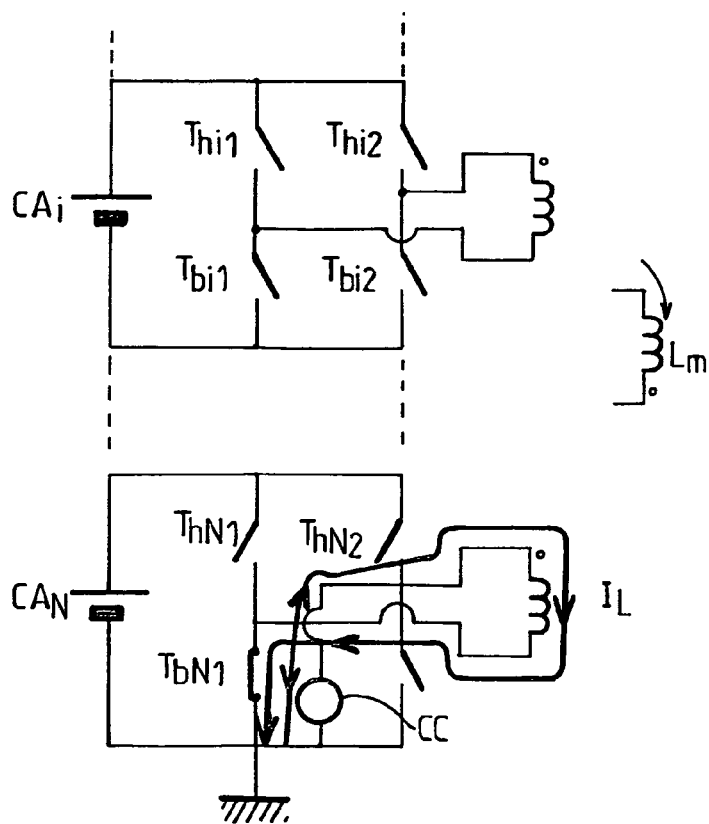

Using a full-bridge inverter as balancing means enables those drawbacks to be mitigated. As shown in FIGS. 9A and 9B, in order to measure a voltage on any of the elements of the battery, it suffices for one of the inverters to be provided with a current sensor CC connected in parallel with one of its switches; in the example shown in the figure, this is the switch $T_{bN2}$, i.e. the bottom switch in the second arm of the $N^{th}$ inverter, associated with the unit $CA_N$ having its negative terminal connected to ground (the "bottom" unit of the battery). Suppose it is desired to measure the charging voltage of the unit $CA_i$. To do this (FIG. 9A), the switches $T_{hi2}$ and $T_{bi1}$ of the inverter associated with this unit are closed: a current $I_L$ then flows through the inverter and charges the magnetizing inductance $L_m$ (all of the other switches of the system being open). The quantity of energy stored in this inductance depends on the voltage across the terminals of $CA_i$. Thereafter, the switches $T_{hi2}$ and $T_{bi1}$ are closed while the switch $T_{bN1}$ of the $N^{th}$ inverter is closed. As shown in FIG. 9B, the energy stored in the magnetizing inductance $L_m$ then discharges through this switch and the current sensor CC. The current measured by the sensor is proportional to the energy stored by the magnetizing inductance, and thus to the voltage across the terminals of $CA_i$. The operation is repeated for all of the units (including $CA_N$): since all of the measurements are performed by the same sensor, differences in charging level among the units are determined in much more reliable manner. In addition, the only component that is specifically dedicated to taking measurements is the sensor CC, and that can easily be incorporated in the corresponding inverter.

The drawback of this technique is that the measurements are performed in serial manner, and not simultaneously. However since each individual measurement requires only a few microseconds, that is not unacceptable in the application under consideration.

Figure 16:
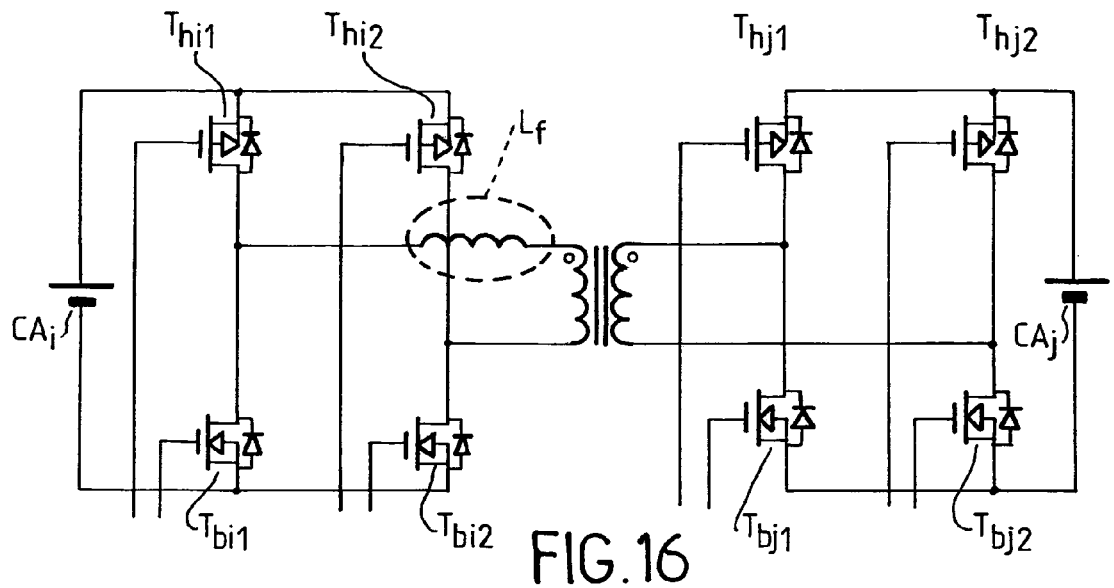
FIGS. 16, 17, and 18 show a "mixed" control mode for the system of the invention.

There exists a third mode of controlling the system of the invention that may be referred to as a "mixed" mode. This control mode differs from natural balancing only in that a variable phase offset is introduced between the signals controlling the various inverters. With natural balancing, energy transfer takes place mainly directly via the coupler, without inductive storage; with forced balancing, energy is transferred essentially via the magnetizing inductance of the coupler; with mixed balancing, direct energy transfer between the unit is still used, but its magnitude and its direction can be adjusted to take account of the leakage inductance in series with the coupler. This adjustment is achieved by introducing a phase shift between the signals controlling the various inverters. FIG. 16 shows the coupling of two units $CA_i$ and $CA_j$ via the coupler, which is represented as being an ideal coupler with a leakage inductance $L_f$ in series.

Figure 17:
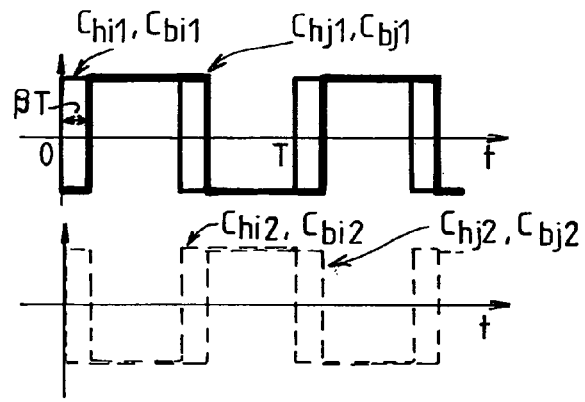

FIG. 17 shows the control signals for the various transistors of the circuit of FIG. 16: $C_{hi1}$ (for the transistor $T_{hi1}$), $C_{hi2}$ (for the transistor $T_{hi2}$), $C_{bi1}$ (for the transistor $T_{bi1}$), $C_{bi2}$ (for the transistor $T_{bi2}$), $C_{hj1}$ for the transistor $T_{hj1}$), $C_{hj2}$ (for the transistor $T_{hj2}$), $C_{bj1}$ (for the transistor $T_{bj1}$), $C_{bj2}$ (for the transistor $T_{bj2}$). The phase shift $\beta T$ can be seen where $0 < \beta < 0.5$, and where T is the duration of the control cycle. The duty ratio is equal to 0.5.

Figure 18:
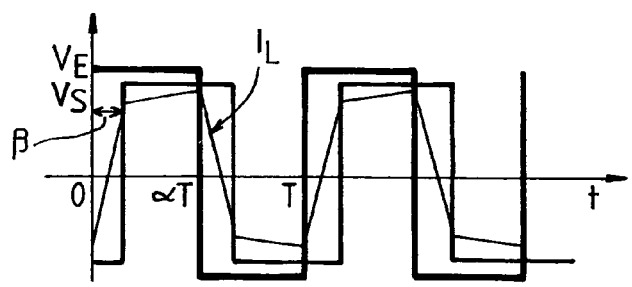

FIG. 18 shows the voltage $V_E$ on the primary winding (corresponding to the element that is to be discharged), the voltage $V_S$ on the secondary winding (corresponding to the element to be charged), and the current $I_L$ in the leakage inductance.

It is possible to adjust the magnitude and the direction of the flow of power between the two units by modifying the phase shift $\beta$.

Theoretical analysis provides the following relationship between the input voltage and the output voltage as a function of $\beta$:

$$V_S = \frac{V_E \cdot R \cdot T}{L_s} \beta (1 - 2\beta)$$

and also gives the output power:

$$P_S = \frac{V_S^2}{R} = \frac{V_E^2 \cdot R \cdot T}{L_s^2} \beta^2 (1-2\beta)^2$$

If the phase shift between the various stages is set once and forever, then the mode of balancing is once more strictly natural. Even under such circumstances, using a phase shift $\beta \neq 0$ (a constant phase shift) can be of use in order to reduce losses in the leakage inductance, in particular when controlling at high frequency (100 kHz or more).

Whatever the mode of balancing, it can happen that a battery element fails: under such circumstances, its potential remains low; any current injected into such an element is dissipated instead of serving to charge it. Such a failure can be catastrophic in the presence of voltage balancing, in particular "natural" (or "mixed") balancing: the failed element absorbs all of the energy made available by the balancing. It is therefore necessary to provide means for isolating elements in the event that they fail.

Figure 10A:
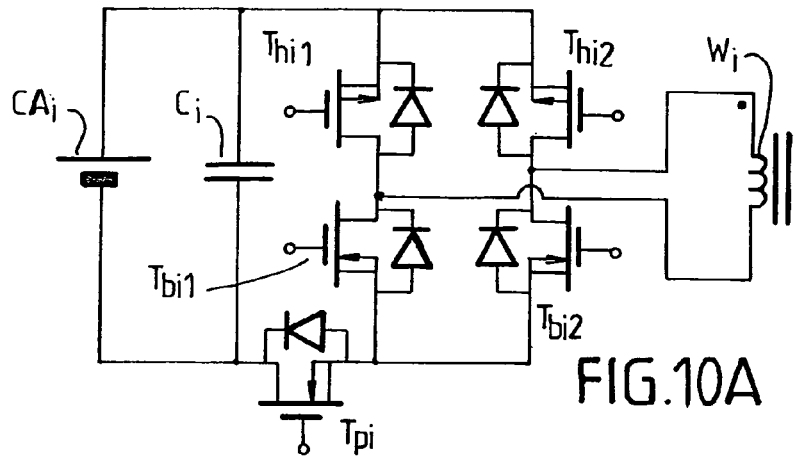
FIGS. 10A and 10B show two different protection schemes for handling the situation in which a battery element or a sub-element thereof has failed.

FIG. 10A shows a first isolating scheme in which a switch $T_{pi}$ (NMOS transistor) is connected in series with an end port of each inverter. Opening this switch serves to isolate the unit $CA_i$ from the magnetic coupler.

Figure 10B:
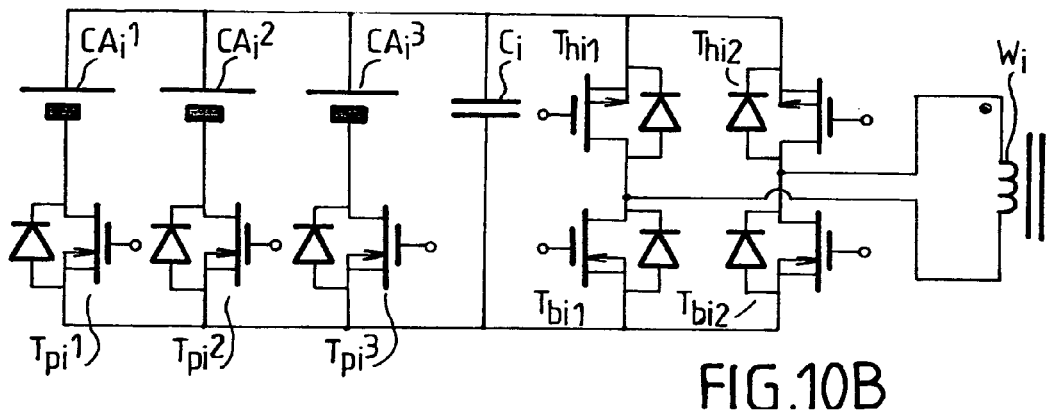

In the scheme of FIG. 10B, the battery element (unit) is made up of a plurality of sub-elements (storage cells) connected in parallel: $CA_i^1$, $CA_i^2$, $CA_i^3$, each of which is connected in series with a respective protection switch: $T_{pi}^1$, $T_{pi}^2$, $T_{pi}^3$. In this way, the failure of a single storage cell does not cause the entire unit to be lost.

The protection switches are advantageously N type transistors, which are preferred over P type transistors because of their lower resistance in the conductive state.

As mentioned above, the active portion (constituted by transistors) of a system of the invention may be integrated in a limited number of chips. If conventional CMOS technology is used, each inverter may be monolithically integrated with its controlling electronics and the associated protection switch(es). Since the reference voltages for each inverter are different, if it is desired to use monolithic integration for a plurality of inverters, it is necessary to have recourse to silicon on insulator (SOI) type technology.

The article by O. Deleage, J. C. Crébier, Y. Lembeye, and R. Rolland "Conception d'un onduleur CMOS avec commande intégrée pour micro-convertisseur DC/DC" [Design of a CMOS inverter with integrated control for a DC/DC microconverter], Colloque EPF'2008, Tours, July 2008, describes a full-bridge inverter that is monolithically integrated using CMOS technology and that is suitable for implementing the invention. As explained in that article, the switching of the arms of the CMOS bridge is critical in power applications. If no precautions are taken during switching, then both power MOSFETs become conductive simultaneously and they short-circuit the battery elements to which they are connected. To avoid that problem, it is necessary firstly to increase the switching speed of the power transistors, and secondly to offset the times at which they switch. This is achieved using a close control circuit that may be incorporated on the same chip as the inverter.

Figure 11:
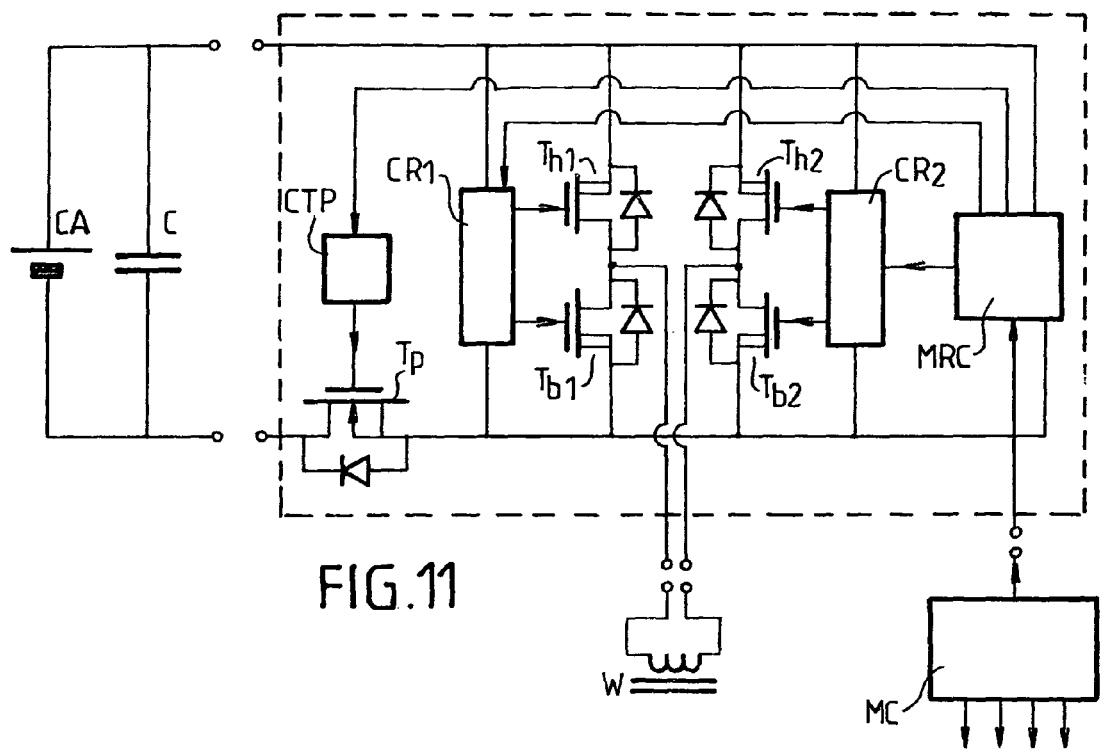
FIG. 11 is a theoretical diagram of a power chip used in an active balancing system of the invention.
Figure 12:
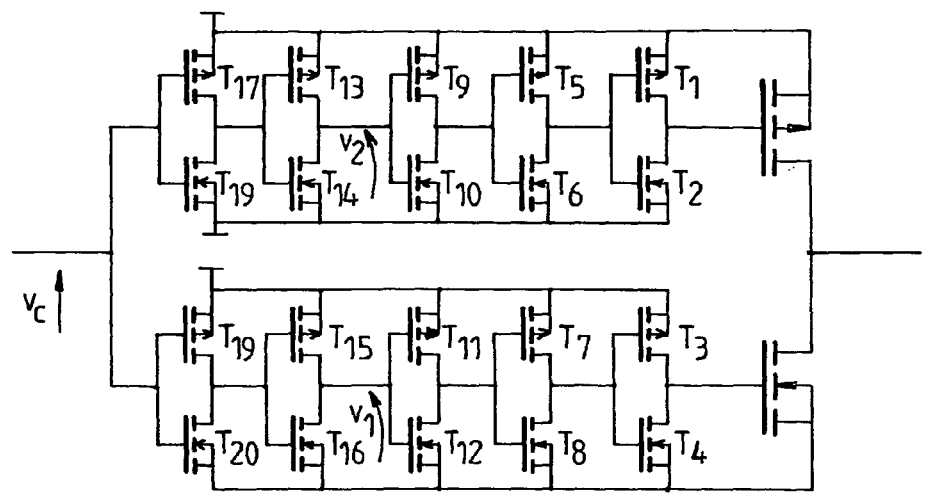
FIG. 12 is a diagram of a control circuit close to a power transistor.

FIG. 11 shows the circuit diagram in principle of such a chip. The core of the chip is constituted by the four power transistors $T_{h1}$, $T_{h2}$, $T_{b1}$, and $T_{b2}$ forming the two bridge arms of the inverter. As explained above, each bridge arm is associated with a close control circuit CR1, CR2 of structure that is shown in FIG. 12. The transistors $T_1$-$T_{11}$ form three stages of amplification for the control signal $V_c$; these transistors are of dimensions that increase on approaching the power element, and their characteristics are determined in such a manner as to provide the best compromise between switching losses and the area of silicon they occupy. The transistors $T_{12}$-$T_{17}$ form the control shifting circuit: the resistance in the conductive state of $T_{18}$ is much greater (e.g. by a factor of 10) than the resistance of $T_{20}$; similarly, the resistance in the conductive state $T_{19}$ is much greater than that of $T_{17}$. Under such conditions, when $v_c$ switches from a low value to a high value, $v_2$ follows more quickly than $v_1$: consequently, the PMOS transistor constituting the top switch of the bridge arm ceases to conduct before the NMOS transistor forming the bottom switch starts to conduct. Conversely, when $v_c$ returns to a low value, $v_1$ follows more quickly than $v_2$: consequently the NMOS transistor ceases to conduct before the PMOS transistor begins to conduct. This guarantees a certain amount of "dead time" at each switchover, during which time neither transistor in the bridge arm is conducting.

The potential switch $T_p$ is also provided with a close control circuit CTP, which is much simpler.

The block MRC constitutes a module for receiving control or configuration signals and it receives "high level" control signals from an external control module MC so as to convert them into signals for driving the circuits CTP, CR1, CR2. Account needs to be taken of the fact that the control module MC needs to drive a plurality of chips that are at different reference potentials (as a function of their positions in the series association of battery elements). The module MRC may thus be implemented in the form of a conventional level shifter or an optical coupler.

Overall, the chip is powered by the battery element CA that it manages, with the capacitor C ensuring continuity of said power supply (in addition to its filtering function). In FIG. 11, bold lines represent conductors conveying electrical power, while fine lines represent conductors that convey only signals.

The control module MC may be made in the form of a dedicated chip, or it may be integrated together with one of the chips forming the inverters.

Figure 13:
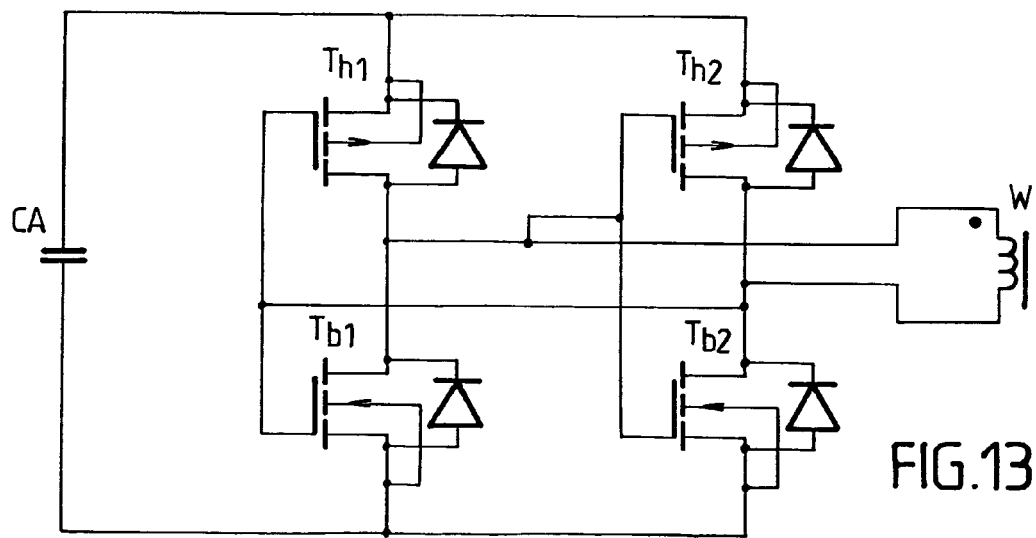
FIG. 13 shows a particular embodiment of the invention in which the inverter switching commands are conveyed by the magnetic coupler.

In a particularly advantageous embodiment, a single inverter ("master inverter") is driven directly by the control module; the other inverters ("slaves") receive switching commands via the magnetic coupler used for transferring power. This principle is shown in FIG. 13, in which it can be seen that the grids of the transistors $T_{h1}$, $T_{b1}$ of the first arm of a "slave" inverter are connected to a first terminal of the winding W and the grids of the transistors $T_{h2}$, $T_{h2}$ of the second arm are connected to a second terminal of the same winding W.

It is assumed that the "master" inverter of the system is driven in such a manner that the second terminal of the winding W of the slave inverter is at a positive potential (in the figure, positive potentials are represented by a dot). The positive potential is transmitted to the grid of $T_{h1}$ and $T_{b1}$. Consequently, $T_{h1}$ becomes conductive, whereas $T_{b1}$ does not conduct. Similarly, the negative potential at the first terminal of the inverter is applied to the grid of $T_{h2}$ that does not conduct and to the grid of $T_{b2}$ that does conduct. In the figure, the transistors that are conducting are surrounded by circles. The "slave" inverter is thus in the same configuration as the "master" inverter.

When the "master" inverter switches, the "slave" inverter follows, after a short delay.

It can be observed that the "slave" inverter behaves essentially like a synchronous rectifier.

This embodiment is advantageous in that it eliminates any need for a dedicated control transmission circuit. However, it is capable of operating only in natural or mixed conditions.

It should be understood that FIG. 13 is merely a simplified diagram: in fact the grids of the power transistors are connected to the terminals of the winding W only via respective close control circuits, with this being for the reasons set out above.

Figure 14:
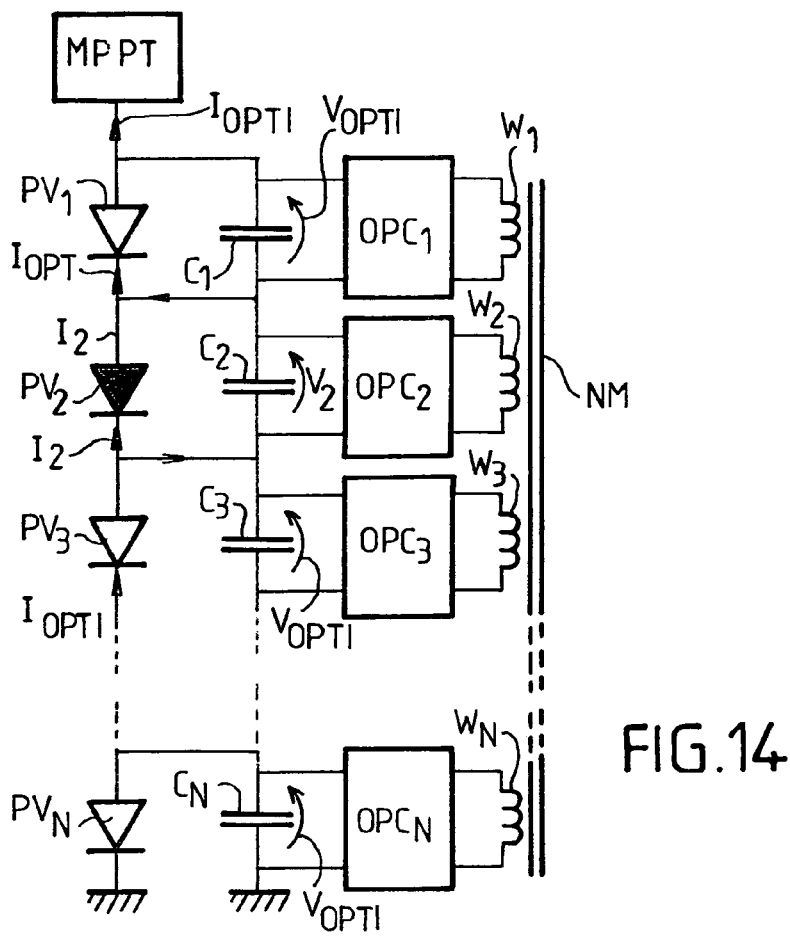
FIGS. 14 and 15 show the use of the system of the invention for balancing a series association of photovoltaic cells.

The description above relates only to balancing voltage in a series association of storage cells or storage cell units. FIG. 14 shows a balancing system of the invention associated with a series connection of photovoltaic cells $PV_1, \ldots, PV_N$, each presenting a parallel-connected capacitor $C_1, \ldots, C_N$. More generally, the elements $PV_1, \ldots, PV_N$ may be individual photovoltaic cells or series and/or parallel associations of such cells. In the limit, they may be photovoltaic panels in a photovoltaic generation system of large dimensions.

Figure 1:
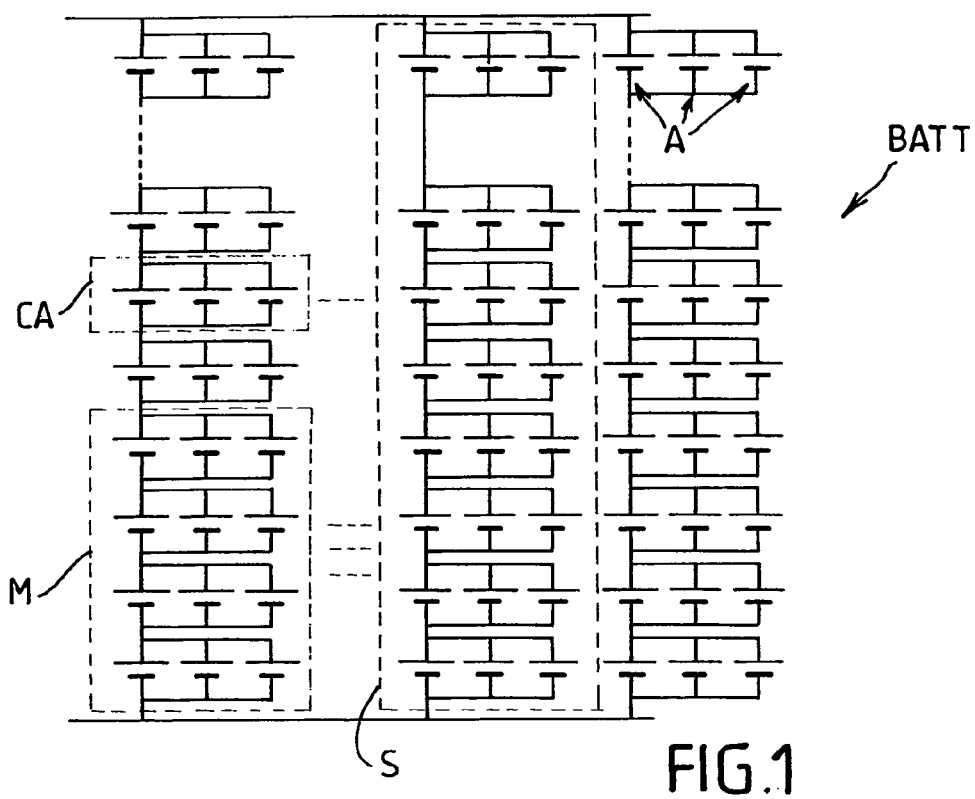
FIG. 1 shows the modular structure of an electrochemical battery.
Figure 2A:
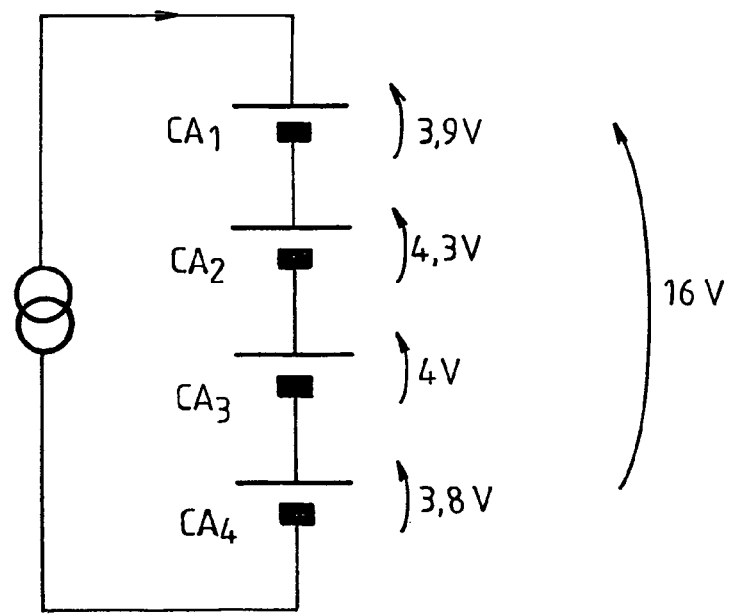
FIG. 2A shows the problem of voltage balancing in a series association of electrochemical energy storage elements.
Figure 2B:
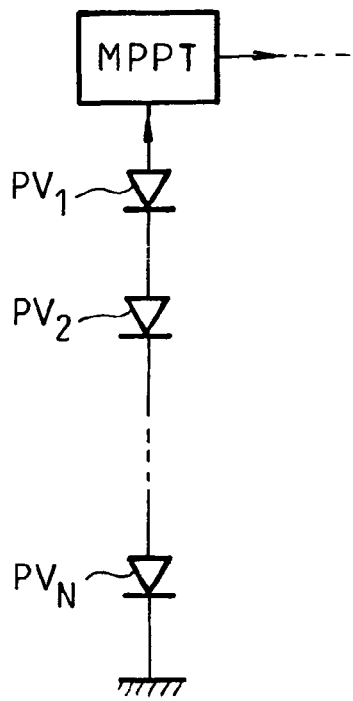
FIGS. 2B and 2C show the need for balancing in a series association of photovoltaic cells.
Figure 2C:
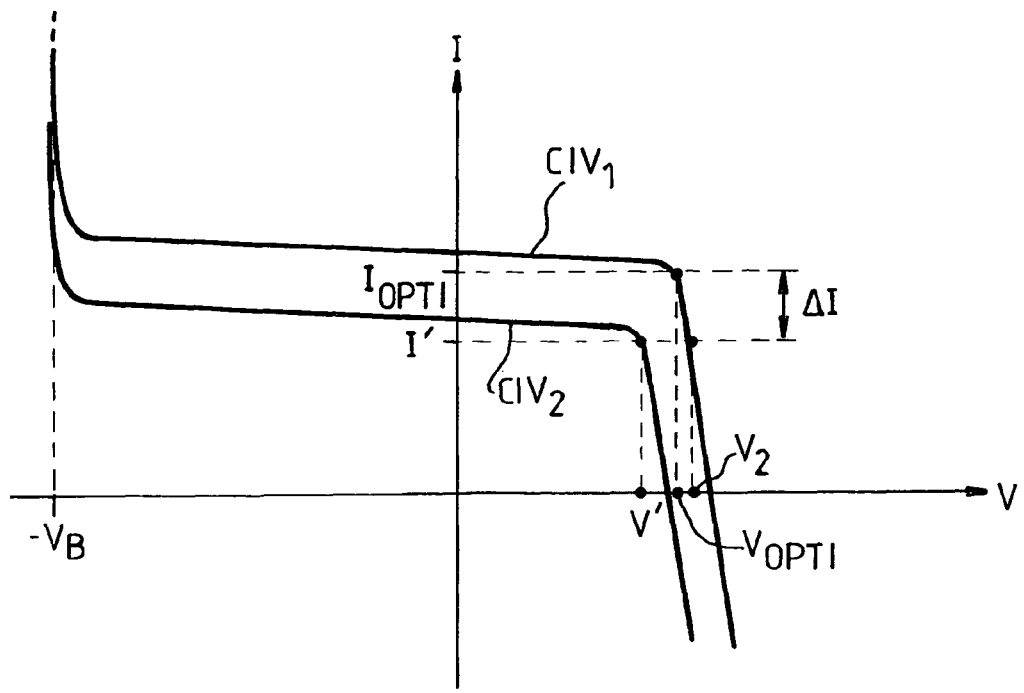
Figure 3:
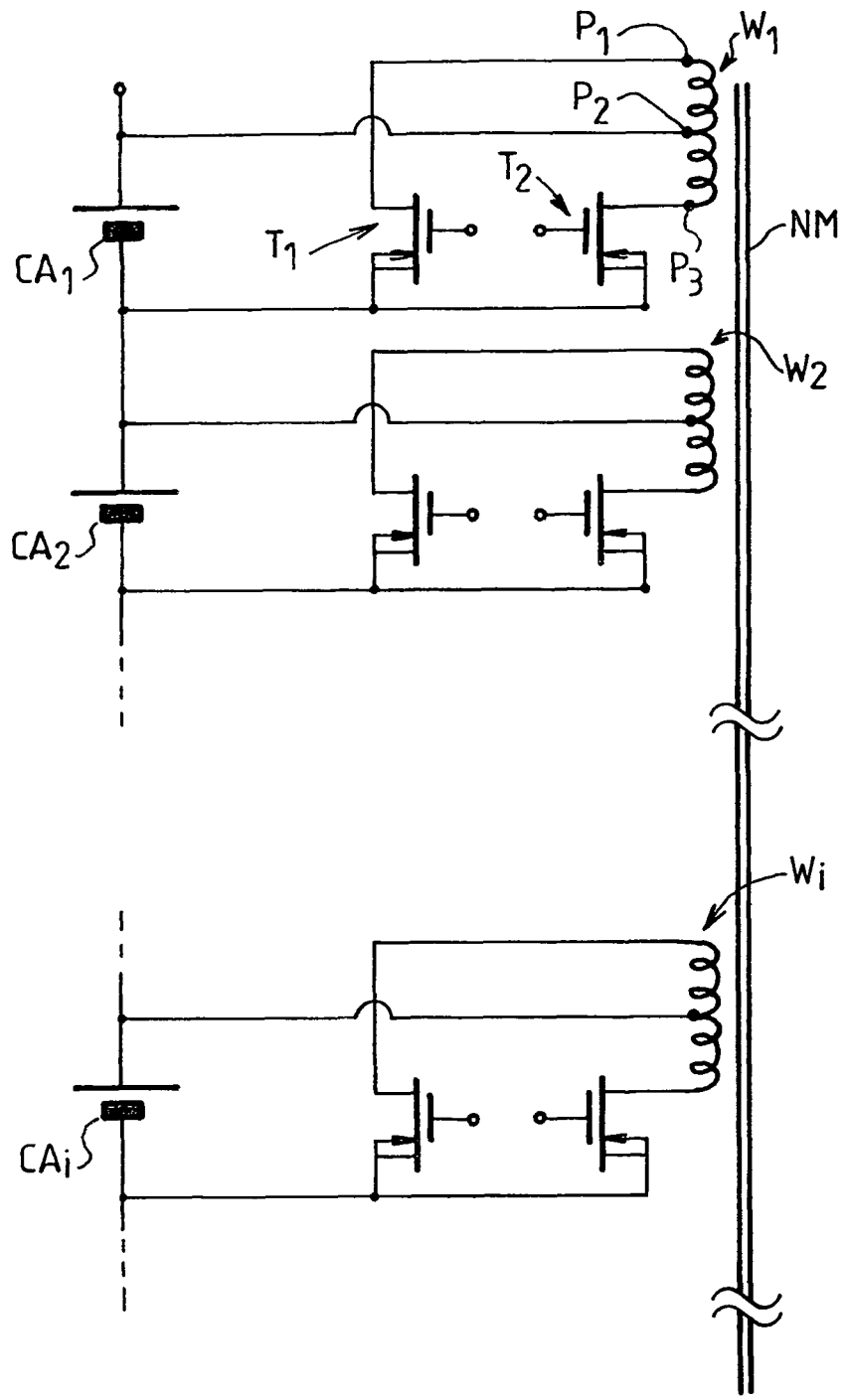
FIG. 3 shows an active balancing system known in the prior art.

As in the example of FIG. 2B, an MPPT module sets the value $I_{OPTI}$ of the current flowing in the cells so as to maximize the power generated. It is assumed that the cell $PV_2$ is shaded or faulty, such that its voltage-current characteristic corresponds to the curve CIV2 of FIG. 2C.

The full-bridge inverters $OPC_1$ and $OPC_2$-$OPC_N$ operate in "natural" mode to transfer energy to the inverter $OPC_2$; this inverter is "supporting" the shaded or faulty cell $PV_2$ delivering a current $\Delta I$. Thus, this cell need only deliver a current $$I_2 = I_{OPTI} - \Delta I$$

which enables it to act as a generator with a voltage $V_2 < V_{OPTI}$ at its terminals. In this way, the power generated by all N cells is given by $$[(N-1)V_{OPTI} \cdot I_{OPTI}] + V_2 \cdot (I_2 - \Delta I)$$

assuming that the balancing is performed with ideal efficiency. In other words, the presence of a faulty or shaded cell no longer affects the performance of the other cells, which can continue to deliver their maximum power $V_{OPTI} \cdot I_{OPTI}$.

As when balancing the voltages of electrical energy storage elements, the generation elements $PV_1$-$PV_N$ may be balanced by "forced" balancing instead of by natural balancing.

It is also possible to apply to series associations of electrical energy generation elements the voltage measurement method described above with reference to FIGS. 9A and 9B. The potential difference across the terminals of the elements $PV_1$-$PV_N$ can be measured to determine when it is necessary to start performing natural balancing or to implement forced balancing.

Figure 15:
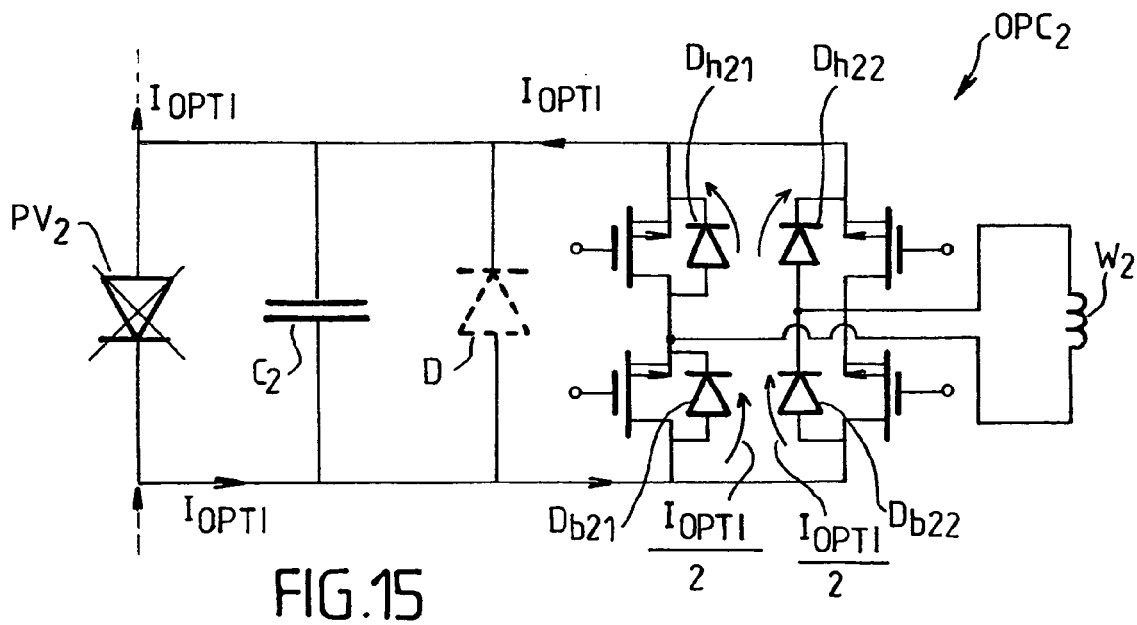

In the event of a severe failure, a cell $PV_2$ may behave like an open circuit. In the absence of the balancing circuit, the entire association of photovoltaic cells would then become unusable. As shown in FIG. 15, the mere presence of a balancing circuit of the invention—even while it is inactive—makes it possible to avoid such total loss of power: the body diode $D_{h21}$, $D_{b21}$, $D_{h22}$, $D_{b22}$ of the transistors in the inverter $OPC_2$ provide bypass paths for the faulty cell. Thus, the loss of generated power is limited to:

$$\Delta P = -(V_{OPTI} \cdot I_{OPTI}) - (2V_d \cdot I_{OPTI})$$

where $V_d$ is the voltage drop across the terminals of each of the two series-connected body diodes. This loss of power can be reduced subsequently by providing a diode D that is connected between the ports of each inverter (showing dashed lines in the figure). This diode may likewise be integrated.

The use of isolating switches such as the transistors $T_{pi}$ and $T_{pi}^1$, $T_{pi}^2$, $T_{pi}^3$ in FIGS. 10A and 10B is also useful for handling circumstances in which one or more elements $PV_1$-$PV_N$ are short-circuited.

The invention claimed is:

1. A system for balancing a series association of elements for generating and/or storing electrical energy, the system being characterized in that it comprises:
   a plurality of full-bridge inverters ($OPC_1$, $OPC_2$, $OPC_N$) each of which is constituted by two inverter arms connected in parallel between two end ports of the inverter, each inverter arm being constituted in turn by two switches ($T_{h1}$, $T_{b1}$; $T_{h2}$, $T_{b2}$) connected in series via a midpoint ($P_{11}$, $P_{12}$) of the arm;
   a plurality of connectors for connecting the two end ports of each full-bridge inverter to a respective element ($CA_1$, $CA_2$, $CA_N$, $PV_1$, $PV_2$, $PV_N$) of said series association; and
   a magnetic coupler (NM) formed by a magnetic core having a plurality of windings ($W_1$, $W_2$, $W_N$) wound thereon, each of said windings being connected to the midpoints of the arms of a respective one of said inverters.

2. A balancing system according to claim 1, wherein a protection switch ($T_{pi}$) is connected in series with an end port of each inverter.

3. A balancing system according to claim 1, wherein each of said elements of said series association is constituted by a parallel association of sub-elements, and wherein each protection switch ($T_{pi}^1$, $T_{pi}^2$, $T_{pi}^3$) is connected in series between each of said sub-elements and an end port of the corresponding inverter.

4. A balancing system according to claim 1, wherein a respective filter capacitor ($C_1$, $C_2$, $C_N$) is connected in parallel with each element of said series association, between the two end ports of the corresponding inverter.

5. A balancing system according to claim 1, also including control means (MP) for generating control signals for controlling said inverters so as to balance said elements.

6. A balancing system according to claim 5, also including measurement means (CC) for measuring the voltage across the terminals of each element of said series association, said control means being adapted to operate said inverters when the maximum voltage difference between two elements exceeds a first threshold, and until said difference drops below a second threshold.

7. A balancing system according to claim 6, wherein said measurement means comprise a current sensor (CC) connected in parallel with a switch of an inverter, the control means being adapted to control each inverter in individual manner in order to store energy in magnetic form in the core of the magnetic coupler, and then to control the inverter fitted with said current sensor so as to discharge said energy in the form of an electric current directed through said sensor.

8. A balancing system according to claim 5, wherein said control means are adapted to control a plurality of said inverters in synchronous manner, with a common duty ratio substantially equal to 0.5.

9. A balancing system according to claim 8, wherein:
   said control means are arranged to control a single one of said inverters, to form a master inverter; and
   the switches of the other inverters of the system, form slave inverters which are controlled by the voltages that appear at the terminals of the respective windings as a result of the operation of said master inverter.

10. A balancing system according to claim 8, wherein said control means are adapted to control said inverters in synchronous manner with an adjustable phase shift between the signals controlling the various inverters.

11. A balancing system according to claim 5, wherein said control means are adapted:
- to act over one half-cycle to control one or more inverters connected to one or more elements of said series association presenting a voltage greater than a reference value in such a manner as to store energy in magnetic form in the core of the magnetic coupler; and then
- over a half-cycle, to control the inverter(s) connected to one or more elements of said series association presenting a lower voltage in such a manner as to discharge said magnetic energy; and
- to repeat the above operations cyclically.

12. A balancing system according to claim 1, wherein each inverter is monolithically integrated on a respective chip.

13. A balancing system according to claim 12, wherein each of said chips also integrates close control means (CR1, CR2, CTP) for said switches, which are implemented in the form of power transistors.

14. A balancing system according to claim 12, wherein said chips are made using CMOS technology.

15. A series association of elements ($CA_1$, $CA_2$, $CA_N$) for electrochemically storing electrical energy and including a voltage balancing system according to claim 1.

16. A series association of photovoltaic cells ($PV_1$, $PV_2$, $PV_N$) including a balancing system according to claim 1.

* * * * *